Patented June 28, 1932

1,864,988

UNITED STATES PATENT OFFICE

CHARLES RAYMOND DOWNS, OF SOUND BEACH, CONNECTICUT, ASSIGNOR TO DAVIS EMERGENCY EQUIPMENT COMPANY, INCORPORATED, OF NEW YORK, N. Y., A CORPORATION OF NEW YORK

AMMONIA ABSORBENT AND PROCESS OF MAKING THE SAME

No Drawing. Application filed September 5, 1930. Serial No. 479,919.

The present invention relates to a novel composition for use in removing ammonia from air to render it suitable for breathing and to a process of making such an absorbent. In addition to the requisite large absorption power and long life use, other highly desirable properties of gas absorbents, for use in canisters for gas masks, are that they effect minimum resistance to breathing, that they exert minimum corrosive action on the canisters, that no fumes or volatile salts are formed by the reaction in removing the gas, and that the heat formed by said reaction is comparatively small so as not to impose the necessity of using means for cooling the effluent air.

Acids, by reason of their great affinity for ammonia gas, have been heretofore proposed, as a means to remove ammonia by reaction therewith. Sulphuric acid, for instance, has been widely used as a constituent of ammonia removing compositions. Organic acids in solid form have also been used. A serious disadvantage of acids, as heretofore used in ammonia removing compositions, is the ineffectiveness of the resulting composition in attaining all of the desirable properties outlined above. For instance, it has been found difficult to use an acid in liquid form to obtain the proper reaction between the acid and the ammonia gas, without impairing the desirable features of minimum resistance to breathing and minimum corrosive action on the canister, and if the acid used was in solid form, it has been found difficult to incorporate a sufficient amount of moisture to facilitate the aforesaid reaction, without further impairing the desirable features of small resistance to breathing and minimum corrosive action on the canister.

An object of the present invention is to produce an ammonia removing composition employing an acid as a means for removing the ammonia and possessing to a great degree all of the above mentioned desirable characteristics of an efficient absorbent, and another object is to produce such a composition by a process which is simple, convenient to perform and economical to carry out in commercial practice.

The composition produced in accordance with the invention is in the form of comparatively dry granules of convenient size so that they may be advantageously used in canisters with minimum resistance to breathing. These ammonia removing granules consist of a comparatively dry gel, preferably silicic acid gel, an organic acid and water, but also contain part of the sodium salt of the acid used when preparing the silicic acid. The pores or interstices of the gel hold the organic acid constituent and substantially all of the water constituent, and all or a large portion of the organic acid constituent is in true solution with this water. The gel thus functions as a carrier of the organic acid which, when ammonia gas is caused to pass through a mass of the granules, reacts chemically with the ammonia to form fixed or non-volatile ammonium salts, this reaction being greatly facilitated by the water and the state of solution of the organic acid. Thus, a great activity is obtained, and there are no corrosive fumes formed by the reaction. Also, because of the exterior dryness of the granules and by reason of the fact that the organic acid constituent is retained within the pores of the gel, the granules when placed for use in canisters, exert much less corrosive action on the canisters, than absorbents heretofore produced employing acids as the means for removing ammonia.

It has been discovered that malic acid, of the type known as inactive malic acid, is extremely advantageous when used as the organic acid constituent of the composition made in accordance with this invention. Malic acid is a comparatively strong acid and a good reagent with ammonia. A large quantity of this acid can be used in admixture with water to produce a solution below the saturation point. Thus, the large amount of malic acid, a very large portion of which is in true solution with water, produces an absorbent of very large capacity, and the malic acid solution in the final product, of the consistency of a heavy syrup, is completely retained within the interstices of the silicic acid granules. However, other organic acids having solubility characteristics similar to malic acid, may be used with great advantage as constituents of the absorbents described herein; among these other acids, may be cited citric acid and tartaric acid.

In accordance with the invention, the ammonia removing composition is arrived at by a simple process which, briefly stated, comprises essentially the following steps: 1. A silicic acid hydrogel is formed in the ordinary way, as by thoroughly mixing sulphuric acid diluted with water with a sodium silicate solution; 2. The silicic acid jelly is subjected to pressure to expel as much of the water as possible. This pressing also removes a large portion of sodium sulphate (formed in step 1 of the process); 3. A very concentrated water solution of an organic acid, preferably malic acid, is mixed with the pressed silicic acid hydrogel, whereby a colloidal mixture of silicic acid particles and an organic acid solution is obtained; 4. The resulting mixture is dried at a comparatively low temperature, such as from 160° to 190° F., for a suitable period of time, which may vary from, say 6 to 20 hours, depending on the organic acid and the quantity of water used, whereby the silicic acid particles set to a gel, which can be broken up into the desired granular mass, the interstices of which gel hold all of the organic acid at least in part in true solution with water, and a small amount of sodium sulphate (formed in step 1 of the process); 5. The dried material is cooled to room temperature and sized by screening.

Experiments with absorbents, containing malic acid as well as other organic acids and made in accordance with the above procedure, proved that the organic acids which did not have the same solubility characteristics of malic acid, could only be incorporated in quantities smaller than that of malic acid, and the affinity for ammonia of the absorbents, containing these less soluble organic acids, was thus inferior to the malic acid product, although possessing the other desirable characteristics of an efficient absorbent. These less soluble organic acids, if used in too large quantities with water, crystallize out after being mixed with the silicic acid and during the drying process, thereby executing small pressures within the granules breaking them into pieces and powder, and come out in particles on the surface of the granules during and after the drying process, this being objectionable as these loose pulverent particles might be inhaled when using the absorbent in canisters for gas masks. However, when using malic acid as the organic acid constituent of the product, the large amount of malic acid which may be used, a very large portion of which is in true solution with water, is completely and permanently retained within the interstices of the silicic acid granules during the drying process and later while the product is in use in canisters for gas masks. Thus, the malic acid product possesses all of the desirable characteristics of an efficient absorbent, including a very large capacity for ammonia gas. Further the product may be produced by a process which is simple and economical.

In carrying out the invention, the following detailed procedure, described in the steps heretofore stated, may be practiced in producing approximately 40 pounds of an ammonia absorbent containing malic acid as the reagent for ammonia, although the proportions of the various materials used may be varied considerably.

1. A sodium silicate water solution is prepared by dissolving 43 kilograms of sodium silicate in 51 gallons of water. The right amount of concentrated sulphuric acid necessary to precipitate silicic acid from this solution with a slight excess of acid is diluted in 13 litres of water, and may be determined by test with small quantities of sodium silicate solution and concentrated sulphuric acid properly diluted with water. This amount of concentrated sulphuric acid varies more or less from 3500 cubic centimeters.

When bringing the diluted sulphuric acid and sodium silicate solution together, care must be taken in avoiding initial coagulation of the silicic acid precipitated, because the silicic acid hydrogel, if allowed to form immediately, might be harmful in that it might contain alkali impurities which would react with the malic acid constituent in the final product. Thus, a preferred procedure is to first add approximately 10 litres of the diluted sulphuric acid to the sodium silicate solution slowly and with good stirring. The mixture at this point is alkaline. The remainder of the diluted sulphuric acid may then be poured in quickly but under vigorous stirring, which may be continued from 5 to 10 minutes, or until the mixture is slightly acid or just neutral to methyl orange. Shortly thereafter, setting of the precipitated silicic acid particles slowly takes place, the solution changing colors and gradually increasing in viscosity. After standing for about ½ hour, a jelly of silicic acid having a glassy blue-white appearance is obtained.

2. A suitable number of canvas bags, say 6, are filled with the silicic acid jelly. These bags are placed in a mechanical press to subject them to such pressure as to expel from the jelly as much of the water as possible; the pressure also removes a large portion (50 to 60%) of sodium sulphate. The pressed material is a rigid white gel, containing sodium sulphate. The weight of the silicic acid hydrogel before being subjected to pressure is about 563 pounds and the weight of the pressed material should be preferably between 190 to 210 pounds.

3. The pressed silicic acid gel is shredded through a No. 4 screen and placed in a mixing apparatus. A malic acid solution is prepared by adding 20 pounds of malic acid in amorphous powder form to 4 litres of water and heating the mixture slowly to from 65 to 70° C. under good stirring. This solution is added to the shredded silicic acid in the mixer, and mixing of the added materials is started. A litre of water is then added to the mixture in a small stream, and mixing is maintained for a period of approximately 20 minutes. The mixed materials, in a mobile suspension, is then passed through a mill so that the silicic acid granules take the form of very small particles. The mixture discharged from the mill is sufficiently liquid to flow and a fine uniform mixed mass consisting of malic acid solution and very small particles of silicic acid. This mixture should not contain any white lumps of silicic acid not saturated with malic acid.

4. The liquid mixture coming from the grinder is poured to a height of one inch in pans covered with brown paper to prevent contact between the surface of the pans. These pans are then placed immediately in a heater which is maintained initially at about an average temperature of 160° F. The material, as it dries, shrinks and breaks up into smaller and smaller pieces, the particles if silicic acid setting to a gel the interstices of which hold a very large portion of the malic acid in water solution and a small amount of sodium sulphate also in water solutions. The material at the edge portions of the pans dries faster than the material at the center portions. Thus, a preferred procedure is to initially dry the material at the aforestated average temperature of about 160° F. for a suitable length of time, say 12 hours. The pans are then removed from the heater, and the material is separated by shifting into groups of different size, or the material may be crushed and screened into groups of different size. The material, thus grouped, is replaced in the pans, and the latter replaced in the heater, the pieces of smaller size and larger size being preferably placed respectively in sections of the heater maintained at lower and higher temperatures than its average temperature. The heater is then maintained preferably at an increased temperature of about from 180° to 195° F., the material being kept in the heater until it has reached the desired state of dryness. A period of time of approximately 20 hours, including the initial period of drying at 160° F., has been found satisfactory in drying the product containing malic acid. The dried material has the form of granules having the appearance of glassy crystals of light yellow color.

5. The dried material is cooled in the air and is then sifted through No. 6 and No. 8 screens.

When the procedure is carried out as outlined in detail above, the yield of the final product containing malic acid is approximately 40 pounds, the fines varying between 10 to 15 pounds.

The process described herein makes possible the production of absorbents containing organic acids other than malic acid as the reagent for ammonia, and such absorbents, when placed in use in canisters for gas masks, are advantageous in that they offer minimum resistance to breathing, exert comparatively small corrosive action on the canisters, produce no fumes and generate only a comparatively small amount of heat in removing the ammonia. The ammonia absorbent containing malic acid, however, not only possesses the above mentioned feature, but is also characterized by its large capacity in absorbing ammonia. When tested in a canister of 650 c. c. capacity, against a 2% ammonia air mixture at the rate of 32 litres per minute and with 50% relative humidity, the product containing malic acid removes the ammonia with 100% efficiency for 30 to 35 minutes.

It is understood that the invention is not limited to the detailed procedure described herein, which is subject to variations or modifications without departing from the principle of the invention.

What is claimed is:

1. An ammonia removing composition comprising substantially dry gel granules the interstices of which hold an organic acid in solution with water.

2. An ammonia removing composition comprising substantially dry gel granules the interstices of which hold a malic acid water solution.

3. An ammonia removing composition comprising substantially dry silicic acid gel granules the interstices of which hold malic acid in solution with water.

4. An ammonia removing composition comprising substantially dry silicic acid gel granules the interstices of which hold an organic acid in solution with water.

5. A process of making an ammonia removing composition, comprising forming a mixture of an organic acid water solution and colloidal particles of a substance capable of setting to a hydrogel whereby such particles become suspended in said solution, and drying said mixture at comparatively low temperature until it forms gel granules holding the organic acid and water within its interstices.

6. A process of making an ammonia removing composition, comprising forming a mixture of an organic acid water solution and colloidal particles of a substance capable of setting to a hydrogel whereby such particles become suspended in said solution, and drying said mixture at comparatively low temperature until it forms substantially dry gel granules holding the organic acid and water within its interstices, part of the organic acid being in solution with the water.

7. A process of making an ammonia removing composition, comprising forming a suspension of silicic acid particles in an organic acid water solution, and drying the resulting mixture at comparatively low temperature whereby it forms silicic acid gel granules holding the organic acid and water within its interstices, part of the organic acid being in solution with the water.

8. A process of making an ammonia removing composition, comprising forming a suspension of silicic acid particles in a malic acid water solution, and drying the resulting mixture at comparatively low temperature whereby it forms silicic acid gel granules holding malic acid in solution with water within its interstices.

9. In a process of making an ammonia removing composition, the step of drying a mixture of a malic acid solution and silicic acid particles suspended therein at from 160 to 195° F. until it forms silicic acid gel granules holding malic acid in solution with water within its interstices.

10. In a process of making an ammonia removing composition, the step of drying a mixture of a malic acid solution and silicic acid particles suspended therein at from 160 to 95° F. for about 20 hours whereby it forms silicic acid gel granules holding a large part of the malic acid in solution with water within its interstices.

11. A process of producing an ammonia removing composition, comprising forming a mixture of a malic acid solution and a silicic acid hydrogel freed of a substantial amount of water, in the proportions of approximately 20 pounds of malic acid, 5 litres of water and 200 pounds of such hydrogel, whereby a suspension of silicic acid particles in the malic acid solution is formed; and drying the resulting mixture at about from 160 to 195° F. until it forms substantially dry silicic acid gel granules holding a large part of the malic acid in solution with water within its interstices.

12. A process of producing an ammonia removing composition, comprising forming a mixture of a malic acid solution and a silicic acid hydrogel freed substantially of water, in the proportions of approximately 20 pounds of malic acid, 5 litres of water and 200 pounds of such hydrogel, whereby a suspension of silicic acid particles in the malic acid solution is formed; and drying the resulting mixture at about from 160 to 195° for approximately 20 hours whereby it forms substantially dry silicic acid gel granules holding a large part of the malic acid in solution with water within its interstices.

13. A process of making an ammonia removing composition, comprising forming a hydrogel, subjecting said hydogel to pressure to free it substantially of water, thoroughly mixing the pressed hydrogel with an organic acid water solution to cause a suspension of small particles of the pressed hydrogel in said organic acid water solution, and drying the resulting mixture at comparatively low temperature until it forms substantially dry gel granules holding an organic acid water solution within its interstices.

14. A process of making an ammonia removing composition, comprising forming a silicic acid hydrogel from a colloidal silicious composition, subjecting said hydrogel to pressure to free it substantially of water, thoroughly mixing said pressed hydrogel with a malic acid water solution whereby a suspension of small particles of silicic acid in said malic acid solution is formed, and drying the resulting mixture at comparatively low temperature until it forms silicic acid gel granules holding a malic acid water solution within its interstices.

15. A process of making an ammonia removing composition, comprising forming a silicic acid hydrogel free of alkali impurities by reaction of an acid with a sodium silicate water solution, subjecting said hydrogel to pressure to free it substantially of water, disseminating said pressed hydrogel in a malic acid water solution whereby a suspension of silicic acid particles in said malic acid solution is formed, and drying the resulting mixture protractedly at about from 160 to 195° F. whereby it forms silicic acid gel granules holding a malic acid water solution within its interstices.

16. A process of making an ammonia removing composition, comprising forming a silicic acid hydrogel free of alkali impurities by reaction of an acid with a sodium silicate water solution, freeing said hydrogel of a substantial amount of water by pressure, disseminating said pressed hydrogel in a malic acid water solution whereby silicic acid particles become suspended in said malic acid water solution and drying the resulting mixture at about from 160 to 195° F. for about 20 hours whereby it forms silicic acid gel granules holding a malic acid water solution within its interstices.

In testimony whereof, I have signed this specification.

CHARLES RAYMOND DOWNS.